May 20, 1969
R. F. SWENSON
3,445,143
ADJUSTABLE SLIDE SUPPORT
Filed May 22, 1967
Sheet 1 of 3
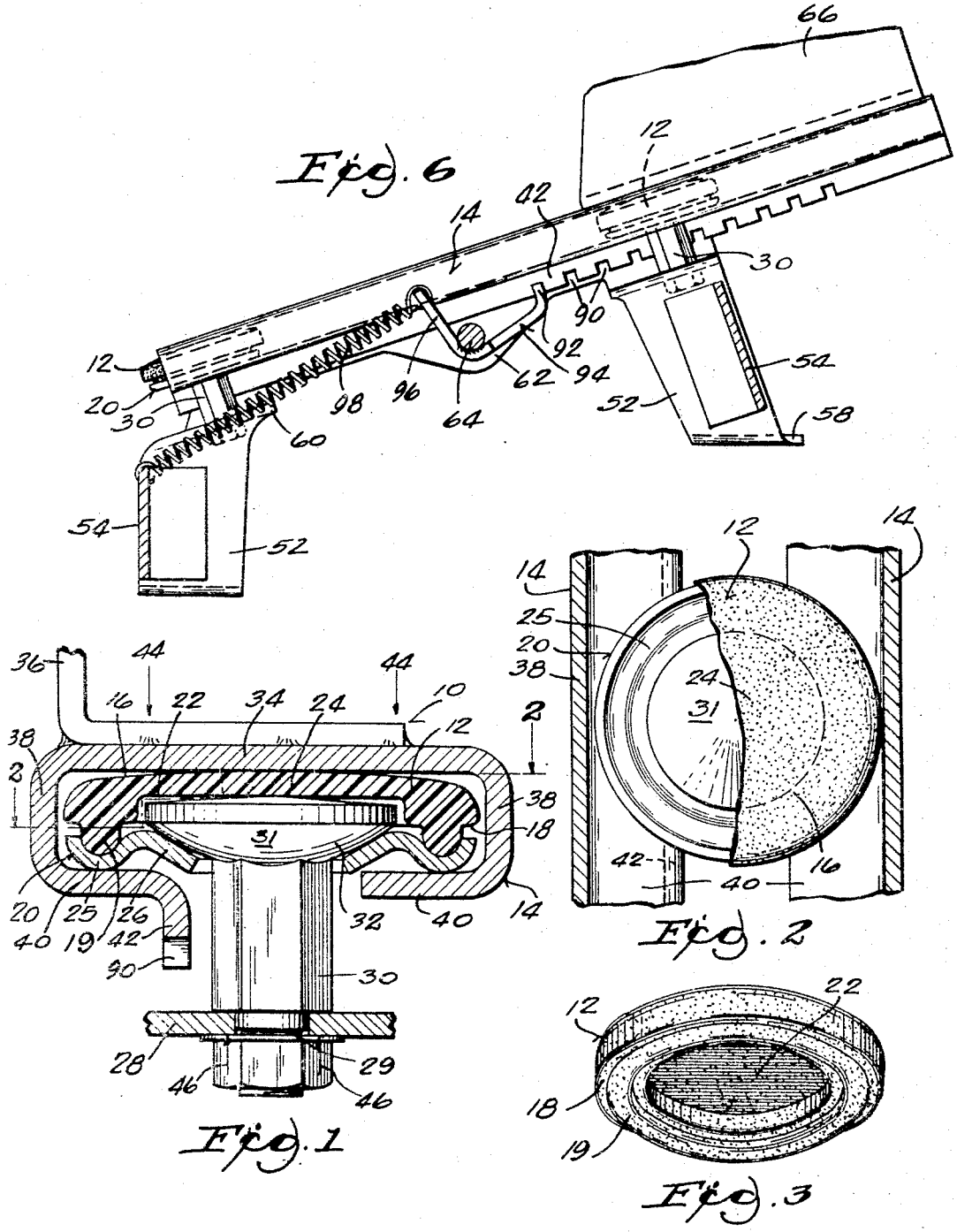
INVENTOR
RICHARD F. SWENSON
BY Lieber & Niller
ATTORNEYS

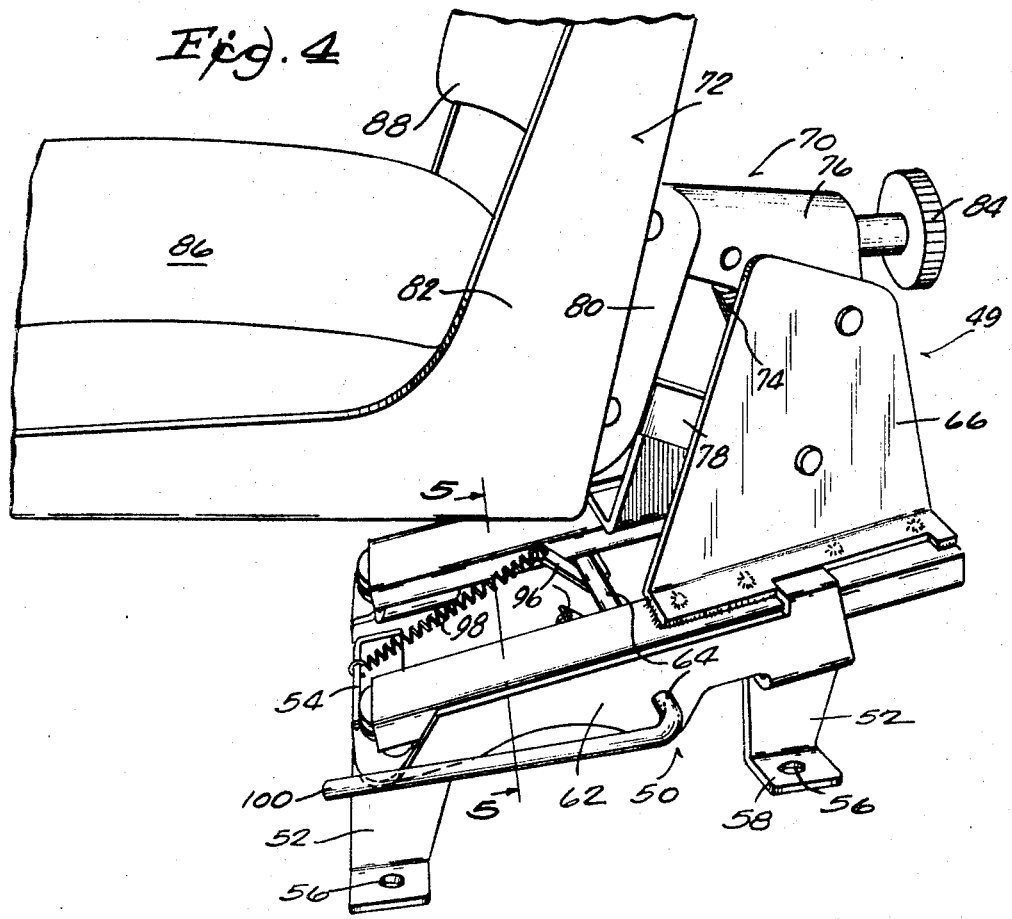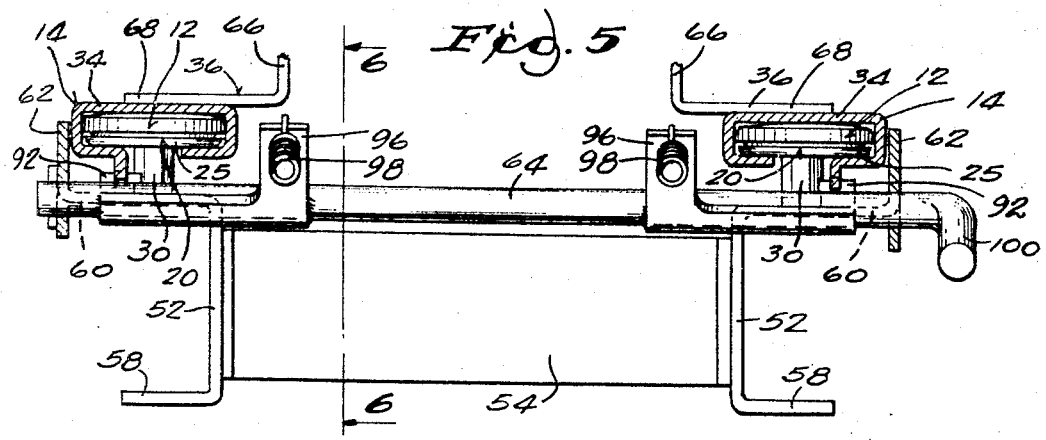

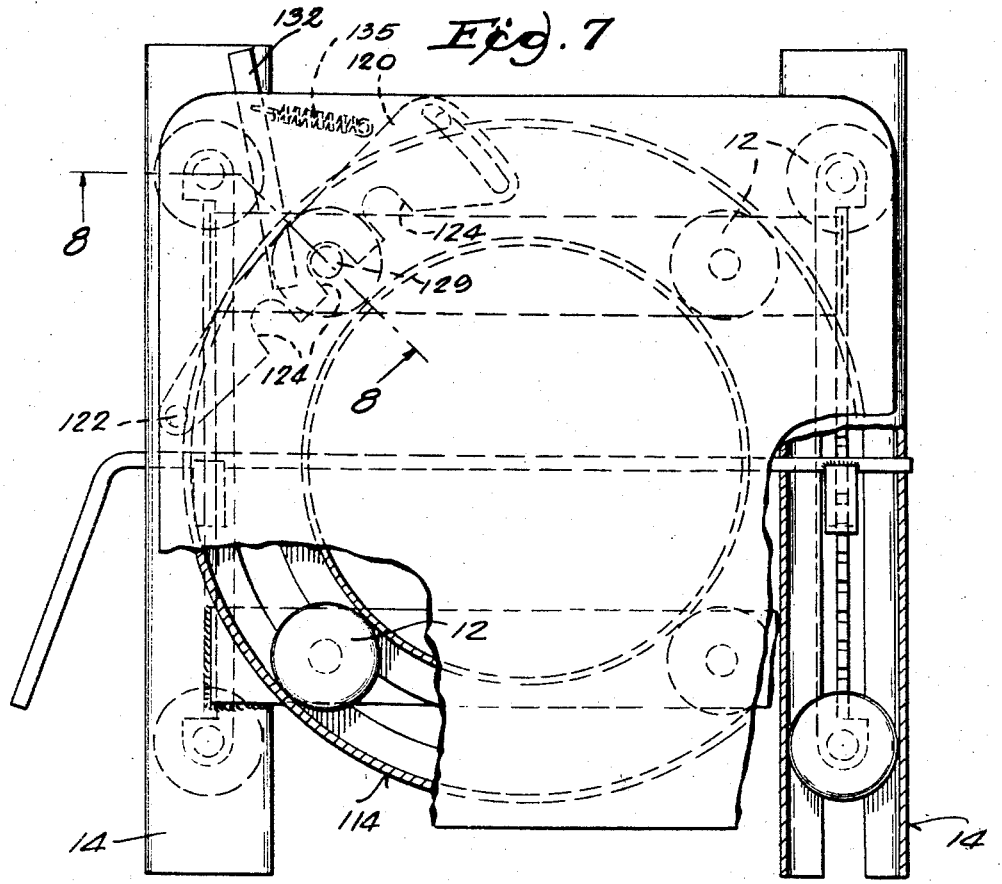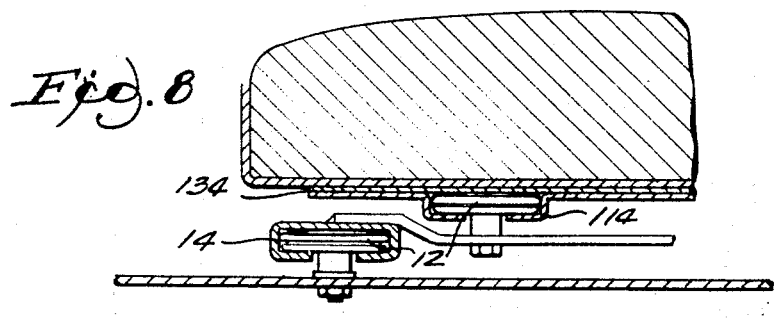

United States Patent Office 3,445,143
Patented May 20, 1969

3,445,143
ADJUSTABLE SLIDE SUPPORT
Richard F. Swenson, Milwaukee, Wis., assignor to Swenson Corporation, Redgranite, Wis., a corporation of Wisconsin
Filed May 22, 1967, Ser. No. 640,066
Int. Cl. F16c 5/00, 17/00, 21/00
U.S. Cl. 308—3                                    9 Claims

ABSTRACT OF THE DISCLOSURE

The present invention relates generally to improvements in suspension devices, and relates more particularly to an improved adjustable slide support adapted for incorporation in assemblages requiring the relative movement and positioning of elements, including load bearing elements, with respect to each other. The improved suspension includes a resilient disk or puck suitable for mounting on one element, the puck being slidably confined within a track on which is mounted the other element.

Background of the invention

Numerous mechanisms have heretofore been devised to facilitate the movement of load bearing elements with respect to each other such as, for example, the movement of an automobile, tractor or other vehicle seat toward or away from the steering wheel of the vehicle. However, these prior mechanisms have often been subject to sticking or jamming during movement of the elements. This has been caused, in the main, by the relatively close tolerances between the part of the mechanism. The propensity of such mechanisms to jam has also been aided by the ability of dirt, dust, and other abrasive and compacting materials to get into and between moving parts of the mechanism. Furthermore, such mechanisms have often been objectionably noisy during movement of the elements and prior devices have additionally been objectionably complicated and expensive because of the inclusion of such elements as costly bearings and/or rollers.

Summary of the invention

It is, therefore, an object of the present invention to provide an improved suspension device for incorporation in assemblages requiring relative movement and positioning of load bearing elements which obviates the aforesaid objections and disadvantages of prior devices.

Another object of the invention is to provide a mechanism of this type which is not subject to jamming and which does not require or employ close tolerances.

Still another object of this invention is to provide a suspension mechanism which is highly efficient and which is moreover relatively immune from entry of dirt or other foreign matter.

A further object of the present invention is to provide a suspension mechanism which is relatively quiet in its use and which is extremely simple and economical in construction.

The gist of the present invention is to provide a suspension device for supporting one load bearing element for sliding movement relative to another element and comprising, a resilient disk-shaped member or puck mounted on one of the elements, and an outwardly open track mounted on the other element and within which the disk-shaped member is confined, the disk-shaped member having a convex bearing surface slidably coacting with the track for movement therealong.

Description of the drawings

Referring to the drawings accompanying and forming a part of this specification:

FIGURE 1 is a fragmentary transverse vertical section through the load supporting elements of a typical suspension device embodying the present invention;

FIGURE 2 is a fragmentary horizontal section taken along the irregular line 2—2 of FIGURE 1;

FIGURE 3 is a perspective view of one of the improved disk-shaped load bearing slide members forming a part of the present suspension device;

FIGURE 4 is a fragmentary perspective view of a typical vehicle seat suspension assemblage illustrating the improved suspension device embodied therein;

FIGURE 5 is a section taken generally along the line 5—5 of FIGURE 4;

FIGURE 6 is another section taken generally along the line 6—6 of FIGURE 5;

FIGURE 7 is a plan view illustrating the invention in a swivel type seat suspension wherein one of the load supporting members is movable arcuately with respect to the other member, parts being broken away to reveal internal structure; and FIGURE 8 is a fragmentary section taken generally along the line 8—8 of FIGURE 7.

Description of the preferred embodiment

Referring now to FIGURE 1, a typical suspension device 10 embodying the present invention is shown therein in transverse cross section. The device thus shown includes a resilient disk-shaped load bearing member or puck 12, hereinafter described in detail, slidably confined within an outwardly open track 14, also described hereinafter in greater detail.

Specifically, the puck 12 is of a disk-shape and is considerably greater in diameter than in thickness. Preferably, the puck 12 is constructed from nylon or other synthetic material requiring little or no lubrication or having self-lubricating properties. The upper or outwardly exposed surface 16 of the member 12 is convex to form an axially directed load bearing surface. The lower surface 18 of the member 12, as seen most clearly in FIGURES 1 and 3, is cut away or recessed to accept a supporting washer 20. The central portion of the member 12 is formed with a cavity 22 to reduce the cross-sectional thickness at the central load bearing portion 24 of the member 12. Among other advantages, this reduction in thickness lends additional resiliency to the central portion 24 of the puck 12.

The washer 20 is formed of a special shape with an annular curved outer portion 25 open upwardly to receive the depending annular wall 19 of the slide puck 12. The puck 12, along with the special washer 20, is mounted on element 28 as by means of a bolt 29 which has a spacing portion 30 terminating at its upper end in a special head 31. Bolt 29 may be anchored or secured to element 28 as by a nut 33, and the head 31 of bolt 29 is conveniently located in the cavity 22 formed in the member 12. As shown, the upper surface of the bolt head 31 is slightly convex as is the lower portion 32 thereof which surrounds and radiates from the upper end of the spacer portion 30. The curved or trough shaped portion 25 of the washer 20, in turn, terminates in an inwardly directed downwardly inclined annular portion 26 which coacts with the lower convex radiating portion 32 of the bolt head 31. Thus, the disk-shaped puck 12 and washer 20 are axially supported on the bolt 29 and are self-alignable.

The track 14 may be formed of metal or other suitable sheet material bent to generally C-shaped cross section to include a plane load bearing portion 34 which slidably coacts with the convex upper load bearing surface 16 of the member 12, and this solid upper portion 34 prevents dirt and other objects from falling into the load bearing and slide mechanism. An element 36 may be suitably secured to the exposed surface of upper portion 34 of the track 14, the sidewalls 38 of which depend from the upper portion 34. As shown in FIGURES 1 and 2, the lateral distance between the adjacent inner surfaces of the sidewalls 38 is slightly greater than the diameter of the puck 12, and the vertical length of the track sidewalls 38 is somewhat in excess of the thickness of puck 12. The depending sidewalls 38 of the track 14 are bent inwardly toward each other along their free lower edges to provide spaced flanges 40 and the washer 20 is slidably supported thereon along its curved outer portion 25 as shown in FIGURE 1. Also, one of the flanges 40 may be bent downwardly to provide a depending flange 42 which forms part of a locking mechanism hereinafter described.

The longitudinal shape of the track 14 may be straight or rectilinear in its longitudinal dimension as shown in FIGURES 2, 4 and 6, or it may be arcuate, as shown in FIGURE 7, so as to comprise part or all of a circle. The shape of the track is, of course, dependent upon the movement desired with respect to one of the elements 28, 36 relative to the other.

With the suspension device 10 thus assembled as shown in FIGURE 1, the assemblage may be compressively loaded, as indicated by force arrows 44. Specifically, in FIGURE 1, a downward compressive force is shown as applied to the element 36 which is mounted on the track 14. In turn, track 14 transmits the applied force through upper portion 34 of the track to the convex load bearing surface 16 of the member 12. The actual area of puck 12 in contact with upper track portion 34 depends upon the compressive load imposed on track 14, and the upper surface 16 of puck 12 will obviously be flattened or compressed to a greater extent as the load is increased to thereby increase the bearing surface which will contact upper portion 34. This permits the pressure between tracks 14 and puck 12 to remain relatively constant over a range of compressive loads. The force or load thus applied to the disk-shaped member or puck 12 will, in turn, be transmitted to the convex head 31 of the bolt 29, and the resultant force 46 is thus applied via bolt 29 to element 28.

The improved suspension device 10 also provides for the relative movement and adjustable positioning of the elements 28, 36 by sliding the puck 12 along the track 14, or vice versa. Specifically, the load bearing surface 16 of puck 12 is slid along the lower surface of upper portion 34 of the track 14. This sliding action is aided by the self-lubricating property of the material used to construct the puck 12 or disk-shaped member. These properties permit the sliding action to occur with the suspension mechanism in either the loaded or unloaded state. Furthermore, the sliding of the upper surface 16 of puck 12 along the plane lower surface of upper portion 34 of the track 14, wipes or otherwise removes any dirt or other foreign matter from both the upper surface 16 of puck 12 and the lower surface of portion 34, thus resulting in a self-cleaning action. The dirt thus removed is furthermore permitted to fall from the suspension device between the bottom flanges 40. Accumulations of dirt which might hinder the operation of the mechanism are thereby effectively prevented due to the constant cleaning of upper surface 16 of puck 12 and the lower surface of portion 34, and the sliding motion between the puck and the track is also essentially noiseless.

FIGURES 4, 5 and 6, show the suspension device 10 adapted for use in positioning a vehicle seat element 49 or the like on a base element 50. In this embodiment, the base element 50 includes a pair of supports 52 running parallel to the direction of movement of the seat element and spaced apart by members 54. Supports 52 are adapted to be positioned on the vehicle as by suitable fastening means extending through holes 56 in flanges 58. In the typical illustration, the supports 52 each include one or more platforms 60 on which a desired number of pucks 12 are mounted as hereinabove described. (See FIGURES 5 and 6.) As shown in FIGURE 6, the axes of the pucks are parallel and the pucks are in longitudinal alignment along the direction of movement of the tracks 14. In the illustration, platforms 60 are formed with vertical lugs 62 which provide journals for shaft 64 forming part of the locking mechanism, but it should be understood that any suitable locking arrangement may be employed.

Seat suspension element 49 includes a pair of spaced vertical walls 66, one of which is mounted on each of a pair of tracks 14 as by welding flanges 68 thereof to the exposed upper portion 34 of the tracks. Each track 14 is then placed on one of the sets of pucks mounted on the platforms 60, so as to slidably confine all of the pucks.

As by way of illustration, a spring and lever mechanism 70 may be attached to the walls or panels 66 to provide for the attachment of a seat assembly 72 to the panels 66 and tracks 14. The mechanism 70 may also include a spring 74 and levers 76, 78, the latter being fastened to both panels 66 and to member 80 on the back seat frame 82. If desired, the effectiveness of spring 74, and hence the amount of cushioning provided to seat 72, may be varied by adjusting the lever arm through which the spring 72 acts, as by means of a knob 84. A seat cushion 86 and backrest cushion 88 are, in turn, mounted on seat frame 82.

The seat suspension 49 may be positioned on base element 50, for example, to move the seat toward or away from the steering wheel of the vehicle by slidably moving the tracks 14 longitudinally over the respective pucks 12. The extent of this movement may be suitably limited by a stop provided by notching flange 42, as at 90, to mate with lip 92 on vertical edge 62, as shown in FIGURE 4. FIGURES 4 and 6 show the seat assembly 49 in its rearwardmost position.

Seat assembly 49 may be locked in the desired position on base element 50, within the limits provided by the notch 90, by means of a suitable locking mechanism. For example, a shaft 64 may be journaled in the vertical edges 62 of the supports 52. The locking means may include flanges 42 on tracks 14, and these flanges may contain notches 90 at intervals therealong. Pawls 94 may then be mounted on shaft 64 so as to be swung into and out of engagement with notches 90 by the rotation of shaft 64. Lever arms 96 of shaft 64 and springs 98 may be connected between the arms and one of the members 54 to bias the pawls 92 into notches 94 when the shaft 64 is released, so as to prevent track 14 from moving over the respective pucks 12.

To unlock the seat assembly 49 from the base element 50, shaft 64 is rotated in a clockwise direction, as viewed in FIGURE 6, as by means of a handle 100 to remove pawls 94 from notches 90. This permits the tracks 14 to slide or move along the pucks 12 to position the seat 72. When the desired position is attained, handle 100 is released to allow springs 98 to bias pawls 94 back into notches 90 to lock the seat element 49 in the desired position on the base element 50.

FIGURE 7 shows another embodiment of the present invention, in which the track, identified by the numeral 114, is circular in its longitudinal dimension. This embodiment may be used to provide an arcuate motion to the track to permit swivelling of an element such as a seat mounted on the upper run 134 of the track 114. In all other respects, the embodiment shown in FIGURE 7 may be substantially the same as that shown in FIGURES 1 through 6. The swivel support thus provided may be used by itself, or it may be incorporated as a supplement to the slide suspension of FIGURES 4, 5 and 6 wherein movement is along a rectilinear path, thus providing both rectilinear and arcuate motion to the element mounted on and carried by the track 114.

In the modification shown in FIGURES 7 and 8, a suitable locking mechanism as shown and described hereinabove with reference to FIGURES 4, 5 and 6 may also be incorporated to lock the rectilinear slide in desired positions of adjustment and suitable locking mechanism may also be embodied in the device to lock the swivel support in desired position. As shown, the locking mechanism for the swivel support may consist of swingable latch arm 120 mounted on pivot 122 and provided with notches 124 selectively engageable with the shanks of the bolts 129. The latch arm 120 may be actuated by a lever arm 132 and may be constantly biased into locking position as by means of a spring 135. Thus, the upper support may be rotated to a desired position upon release of the latch 120 and may be locked in such selected position by the latch.

It should be appreciated that the suspension mechanism of the present invention is subject to modification and variation in construction and use, and it is desired to include, in the appended claims, all such modifications and variations as fall within the true scope and spirit of the invention. Also, the specific application of the suspension device to vehicle seating assemblages as illustrated herein should not be construed as limiting its use and adaptations, since the device may be employed with a high degree of effectiveness in most instances wherein one load bearing element is supported for sliding movement relative to another element. In other words, it is intended that the term "suspension device" as used herein shall be interpreted in a broad sense to include adjustable slide supports adaptable for various purposes.

Various modes of carrying out the invention are contemplated as being within the scope of the following claims particularly pointing out and distinctly claiming the subject matter which is regarded as the invention.

I claim:

1. In an adjustable load support, a downwardly open channel-shaped track having inturned side wall portions, a resilient disk-shaped member confined within said track and having an upper convex bearing surface slideably coacting with the upper wall of said track, said resilient member having an annularly arranged depending support, and a retaining plate confined within said track below said resilient member, said plate having an annular detent slideably coacting with the inturned side wall portions of said track and providing a seat for the annularly arranged depending support of said resilient member.

2. An adjustable load support according to claim 1, wherein the support for the resilient member is a continuous annular depending wall formed integral with said resilient member.

3. An adjustable load support according to claim 1, wherein an attachment element is provided, said attachment element having a head held captive between the resilient member and the retaining plate and a shank depending therefrom through the opening in the track.

4. An adjustable load support according to claim 3, wherein the disk-shaped member is formed with a downwardly open recess within the area defined by its depending support, and the head of the attachment element is confined within the recess.

5. An adjustable load support according to claim 3, wherein the head of the attachment element has an upper convex surface coacting with the adjacent surface of the resilient member.

6. An adjustable load support according to claim 5, wherein the retaining plate is formed with an inwardly and downwardly inclined portion within the area defined by the annular detent, and the head of the attachment element has an annular convex surface surrounding the shank and coacting with the inclined portion of said plate.

7. An adjustable load support according to claim 1, wherein an adjustment mechanism is provided which includes locking means cooperable with the track for retaining said track in selected positions of adjustment.

8. An adjustable load support according to claim 1, wherein a plurality of parallel rectilinear tracks are provided for supporting a seat, each of said tracks having at least one of the disk-shaped members and retaining plates confined therein.

9. An adjustable load support according to claim 1, wherein the track is longitudinally arcuate for supporting a seat element for arcuate movement.

References Cited

UNITED STATES PATENTS

| 2,352,678 | 7/1944 | Angell | 308—3.6 X |
| 2,606,091 | 8/1952 | Buchy | 308—3.6 X |
| 2,739,195 | 3/1956 | Bales | 308—238 X |
| 2,886,095 | 5/1959 | Heyl | 308—3.6 |
| 2,914,793 | 12/1959 | McMahan | 248—425 |
| 3,062,592 | 11/1962 | Allen | 308—3.6 |
| 3,171,698 | 3/1965 | Campbell | 308—3.8 |
| 3,184,208 | 5/1965 | Tanaka | 248—429 |
| 3,326,616 | 6/1967 | Levenberg | 308—36 X |
| 3,350,046 | 10/1967 | Kirk | 248—430 |

MARTIN P. SCHWADRON, *Primary Examiner.*

L. L. JOHNSON, *Assistant Examiner.*

U.S. Cl. X.R.

248—349, 425, 429; 308—3.6, 135, 238